(12) United States Patent
Blansett

(10) Patent No.: US 7,220,125 B1
(45) Date of Patent: May 22, 2007

(54) MULTI MODAL SPEECH CUEING SYSTEM

(76) Inventor: Marianne Michele Blansett, 1702 N. 27th St., Boise, ID (US) 83702

( * ) Notice: Subject to any disclaimer, the term of this patent is extended or adjusted under 35 U.S.C. 154(b) by 129 days.

(21) Appl. No.: 10/938,801

(22) Filed: Sep. 10, 2004

Related U.S. Application Data

(60) Provisional application No. 60/502,062, filed on Sep. 11, 2003.

(51) Int. Cl.
*G09B 19/04* (2006.01)
(52) U.S. Cl. .................. 434/185; 434/156; 434/178
(58) Field of Classification Search ................ 434/156, 434/157, 159, 167, 168, 172, 176, 185, 178
See application file for complete search history.

(56) References Cited

U.S. PATENT DOCUMENTS

| | | | | |
|---|---|---|---|---|
| 1,735,883 A | * | 11/1929 | Smith | 40/618 |
| 2,937,460 A | * | 5/1960 | Everett | 434/172 |
| 4,427,390 A | * | 1/1984 | Manger | 434/159 |
| 4,443,199 A | * | 4/1984 | Sakai | 434/170 |
| 5,429,514 A | * | 7/1995 | Brinson | 434/172 |
| 5,788,503 A | * | 8/1998 | Shapiro et al. | 434/172 |
| 5,957,692 A | * | 9/1999 | McCracken et al. | 434/159 |
| 6,890,180 B2 | * | 5/2005 | Sterns et al. | 434/157 |

\* cited by examiner

*Primary Examiner*—Kurt Fernstrom

(57) ABSTRACT

The present invention is a speech cueing system that incorporates a multi modal (auditory, visual, tactile-kinesthetic) approach to teaching speech sounds and an accompanying apparatus. The system provides explicit instructions on how to utilize the apparatus in the method of multi modal teaching The apparatus is a planar surface equipped with fixed and moveable cue markers and vowel and consonant sound cards. The planar surface has securement locations at either end and along the fixed cue marker, for placement of the movable cue marker and sound cards in specific arrangements to teach various sound combinations, as set forth in the written instructions. The instructions also include designated tactile kinesthetic hand movement patterns that work in conjunction with the set up of the apparatus for the given sound combinations.

3 Claims, 7 Drawing Sheets

MULTI MODAL SPEECH CUEING SYSTEM

CROSS REFERENCE TO RELATED APPLICATIONS

Figure 1:
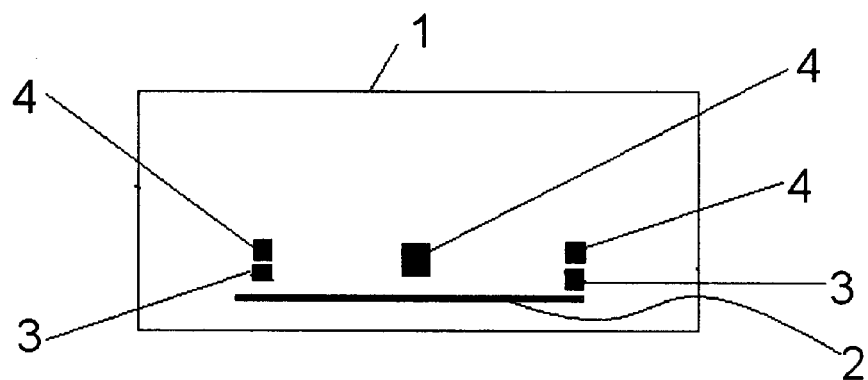
Figure 1:
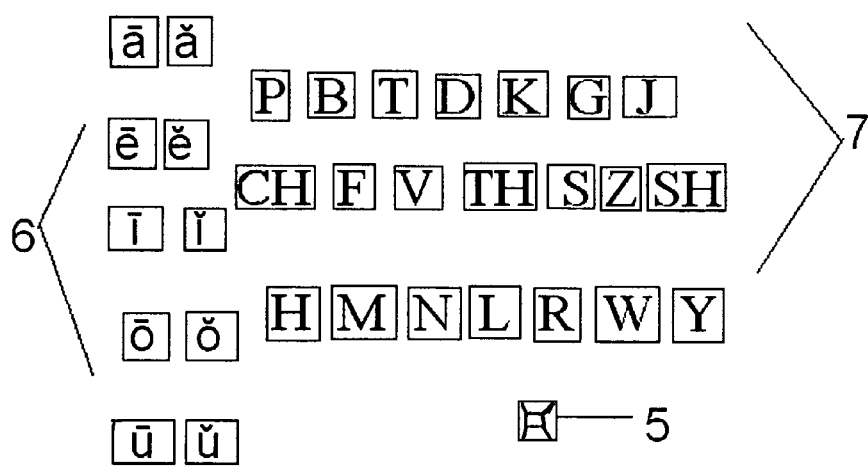

This application claims benefit of PPA 60/502,062, filed Sep. 11, 2003 by the present inventor.

FEDERALLY SPONSORED RESEARCH

NA

SEQUENCE LISTING OR PROGRAM

NA

BACKGROUND OF THE INVENTION

1. Field of Invention

This invention relates to therapy tools utilized in the field of speech/language pathology and/or education and is a self-contained system providing clients/students with multi modal cues to aid in their production of various sounds.

2. Prior Art

Speech cues are a means of providing a student/client with information on how to produce a sound. They can be auditory (saying the sound, syllable, or a word with special emphasis on distinguishing characteristics of that sound, or telling the client what to do with his/her lips, tongue, teeth, or larynx) visual (use of a mirror with the therapist's model or visual demonstration by the therapist of what to do with their tongue, lips, and teeth or pictures of visual representations of such) or tactile-kinesthetic (use of touch and or movement/feel to emphasize certain distinguishing characteristics of a sound). Many speech language pathologists/teachers utilize these multi modal cues in numerous combinations to assist in teaching accurate identification, production, and inclusion of various and specific speech sounds. Current practice involves providing any variety of these cues through such means as giving an auditory model, verbally telling a student how to make a sound, making up a reminder phrase or poem, or providing a visual representation of what the tongue, teeth, lips are doing during production of a specific sound. Tactile-kinesthetic cues are currently provided through such means as touching, tapping, and sliding of fingers on and around the face, hands, and/or arms, taping string or yarn on a table top and having the client run their finger over the string or yarn, or use of an object to represent inclusion of a sound. These methods, although similar and based on the same philosophy that the extra element of touching added to auditory and visual input, give more information, are believed to not yet be combined in a portable, specifically tailored, and self contained system. Also, they are somewhat vague for use with teachers and parents.

BACKGROUND OF INVENTION—OBJECTS AND ADVANTAGES

Accordingly, several objects and advantages of the invention are that this system provides all necessary "pieces" in a compact and portable unit so that the therapist is not constantly searching for tape or yarn or a block to mark a stop consonant. Often times within the context of a therapy session, you do not know before hand where you need to go with any particular individual with a particular sound. It depends on how they respond to the various cues provided. Therefore another advantage of this invention is that it allows for greater flexibility within the same therapy session in that you can quickly move from adding or diminishing the cues provided as well as adjust the linguistic complexity level (whether you are producing a sound at the isolation, syllable, word, phrase/sentence, or conversation level.). Another advantage is that young children respond well to repetition and routine. When the multi modal speech board is brought out within the context of the therapy session, the child knows exactly what to expect. The multi modal speech cueing system also affords a concrete means by which parents and classroom teachers can easily be trained to facilitate carryover and generalization of skills taught in the therapy sessions by providing positive and like practice outside the therapy setting. Also, there are many different methods of improving an individual's articulation skills. This system can be used for all methodologies whether traditional, phonological, etc. Further objects and advantages will become apparent from a consideration of the drawings and ensuing description.

SUMMARY

The present invention is a sound cueing system which combines a planar surface (board, screen) and a variety of cue markers and sound cards. The surface itself is equipped with a fixed cue marker which is linear and has two ends as well as two securement locations for the movable cue marker, one location towards each end of the fixed linear marker. By placing the movable cue marker and sound cards on the surface in specific combinations as outlined in written directions the client/student is provided optimum multi modal cues for the specific sound being taught and to meet the individual's client/student's learning style. The present invention provides auditory, visual, and tactile-kinesthetic cues in one convenient (all necessary materials are together) and effective (cue marker and sound card combinations are based on years of theory and practice in speech pathology) system. When working with a client, especially in the early phases of therapy, a clinician might not yet know which modality (auditory, visual, tactile-kinesthetic) will prove to be most useful for that individual or particular sound. With this system, all avenues are pursued easily and immediately as all necessary materials are provided and accessible.

DRAWINGS: LIST OF REFERENCE NUMERALS

1 Planar surface (Board/screen)
2 Linear fixed cue marker
3 Securement Location #1 (2) (for movable cue marker)
4 Securement Location #2 (3) (for sound cards)
5 Moveable cue marker
6 Short and Long Vowel Sound Cards
7 Stop and Nonstop Consonant Sound Cards

DRAWINGS—BRIEF DESCRIPTION OF

FIG. 1 View of preferred general embodiment of this invention.

Figure 2A:
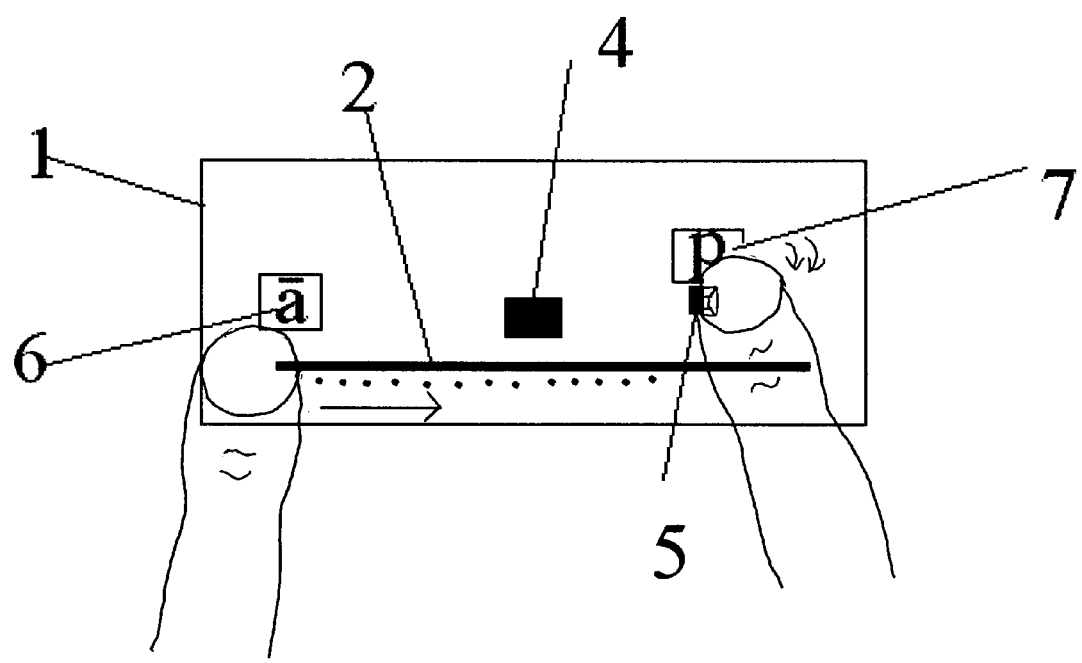

FIG. 2A View of vowel-stop consonant arrangement.

Figure 2B:
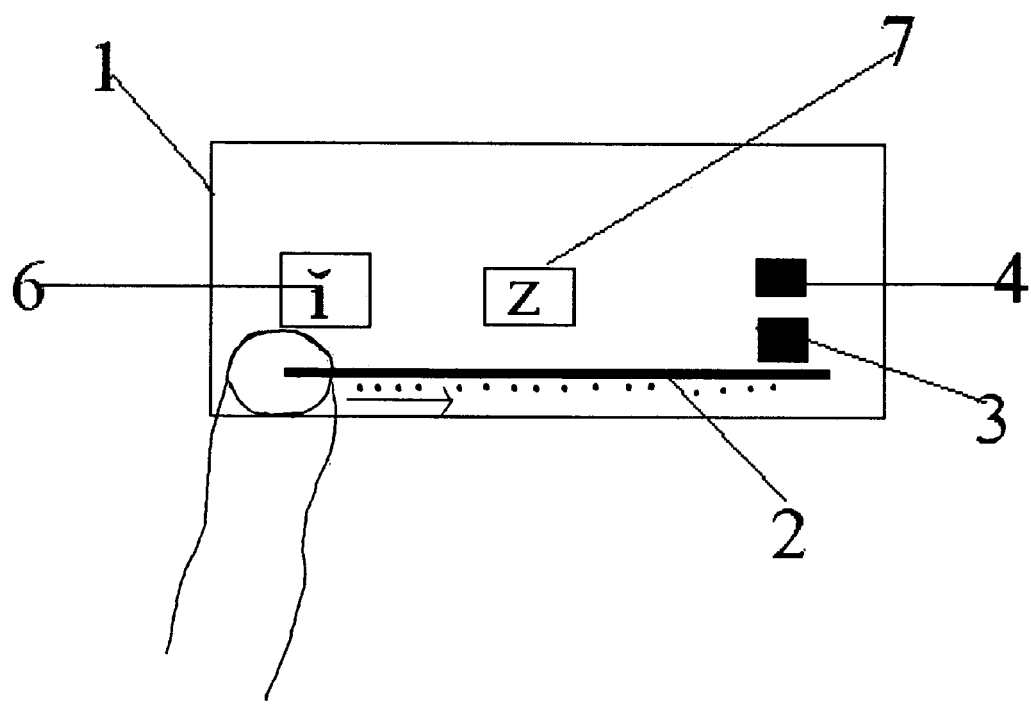

FIG. 2B View of vowel-nonstop consonant arrangement.

Figure 3A:
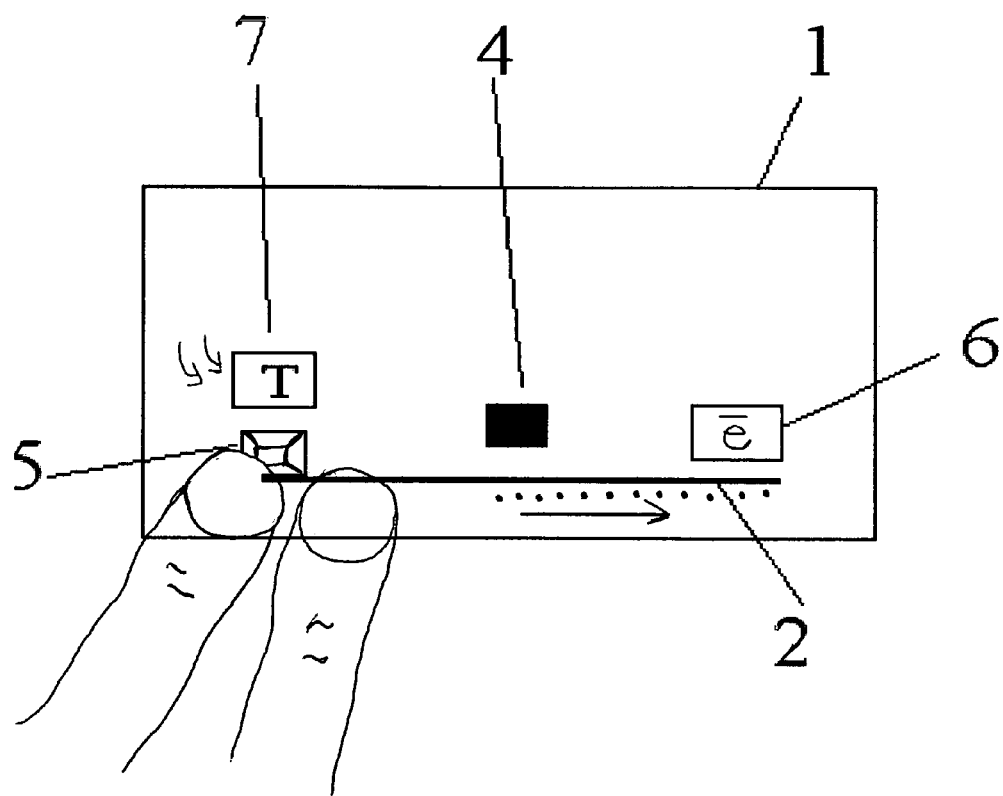

FIG. 3A View of stop consonant-vowel arrangement.

Figure 3B:
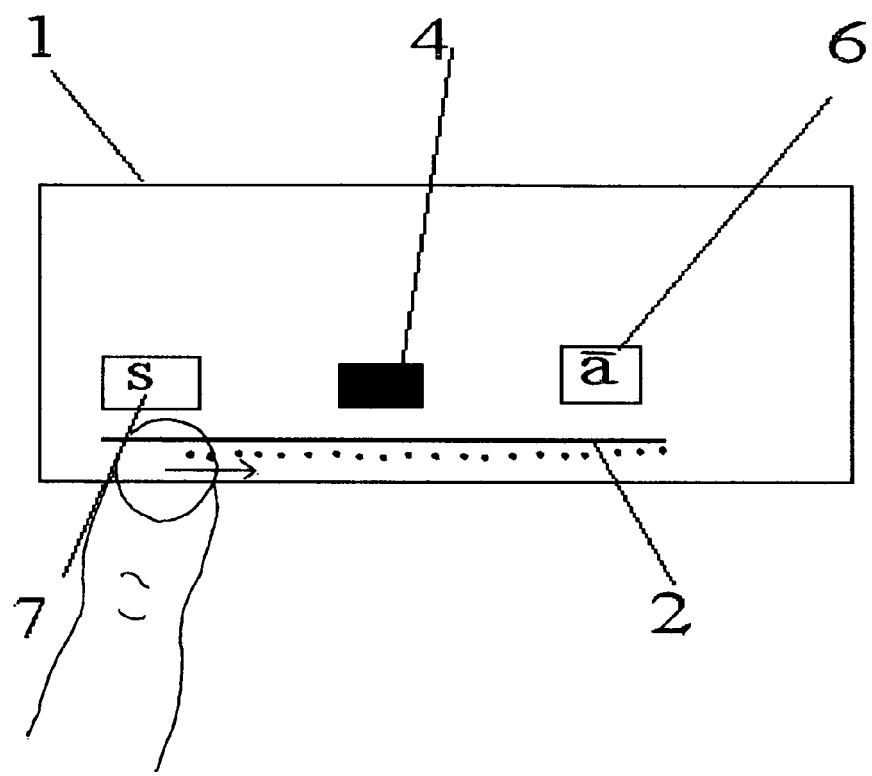

FIG. 3B View of nonstop consonant-vowel arrangement.

Figure 4A:
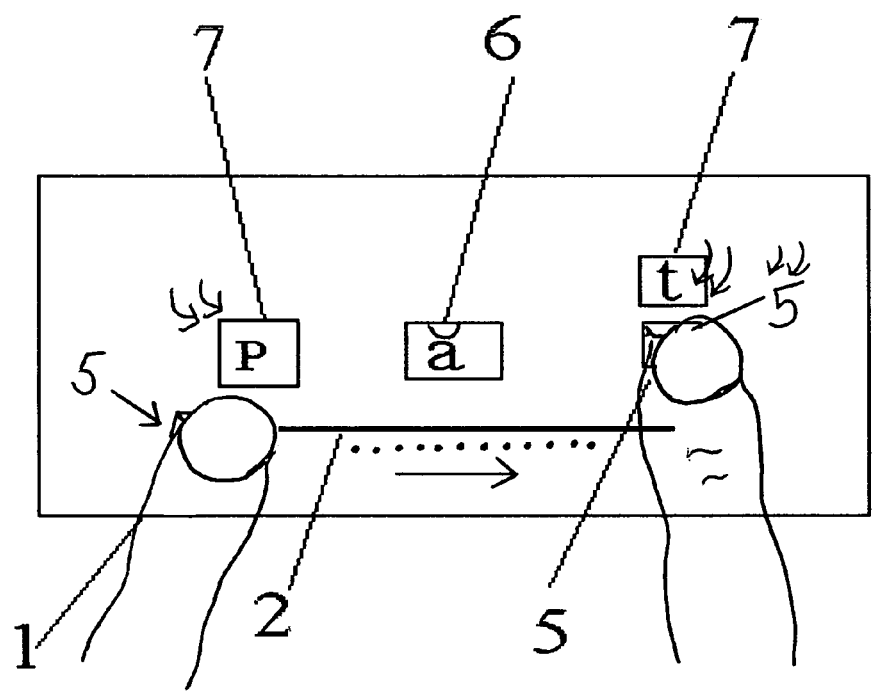

FIG. 4A View of stop consonant-vowel-stop consonant arrangement.

Figure 4B:
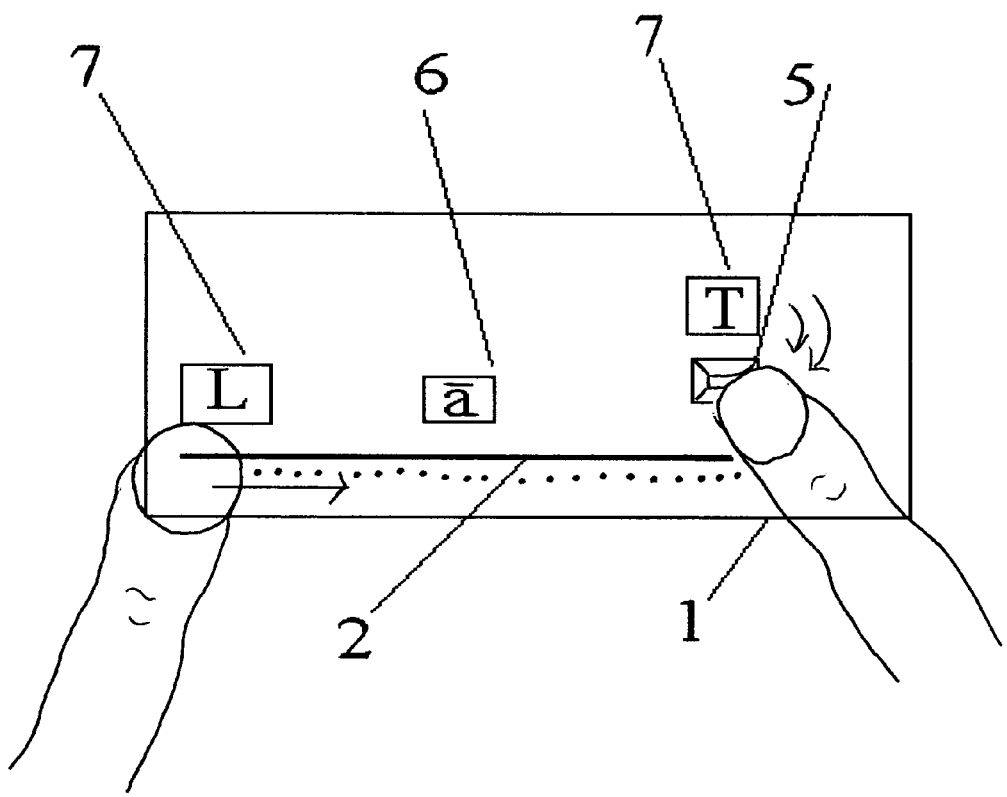

FIG. 4B View of nonstop consonant-vowel-stop consonant arrangement.

DESCRIPTION OF THE PREFERRED EMBODIMENTS

Referring to FIG. 1 there is depicted a planar surface 1 including a linear fixed cue marker for nonstop consonants and vowels 2 and securement locations 3, 4 (for moveable cue marker 5 and sound cards 6, 7) at either end and along this fixed cue marker. Also pictured are the moveable cue marker 5 and the vowel cards 6 and consonant cards 7.

Although in the field of speech language pathology, speech sounds/phonemes may be classed in various and specific ways based on the study of phonetics, for simplicity sake and because teacher and parents who do not have a background in phonetics, will also utilize this system, sounds will be grouped only as vowels, stop consonants, and nonstop consonants. Vowels will include both the typical long and short sounds. Consonants p, b, t, d, k, g, ch, j will be considered stop consonants, and f, v, t, h, s, z, sh, h, m, n, l, r, w, y will be considered nonstop consonants. Sound cards will be included for all these listed vowel and consonant sounds.

Two types of cue markers are also included with the system. These include a fixed cue marker 2 which is linear and has two ends and a moveable cue marker 5 which attaches to the surface via preferred hook and loop fastener (velcro), magnets, or sticky adhesive. The fixed cue marker 2 which is actually part of the planar surface 1 will mark vowel sounds and nonstop consonants. The planar surface can be any sheet of rigid material with enough surface space to hold the cue markers, attachment locations and several sound cards. The fixed cue marker is linear and preferred is either raised as a piece of yarn above the flat surface of the planar board, or could be indented such as a pencil well on a desk so as to give maximum tactile kinesthetic emphasis. The moveable cue marker will mark stop consonants. The movable cue marker 5 and sound cards 6, 7 are placed on the planar surface 1 in specific arrangements on the securement locations 3, 4 at either end or along the fixed linear cue marker 2, as determined by the accompanying written instructions. The moveable cue marker can be any small (approx 1 in) hard object, preferred is one inch colored wooden block. The sound cards are card stock laminated with securement material on reverse. Preferred is 3" by 5" index card cut in half, laminated with velcro on reverse side.

DESCRIPTION—OPERATION OF THE INVENTION

As mentioned in the above section, depending upon the sound and context in which it is being taught, and guided by the written directions, the cue markers and sound cards are arranged on the planar surface. For example, a consonant may be taught in a vowel-consonant (VC) or consonant vowel (CV) syllable. This can be a nonsense syllable pa or a meaningful word pa=pay. It can also be taught in the initial or final position of a consonant-vowel-consonant word (CVC).

Once the therapist/teacher decides on what sound he/she is going to teach, and in what phonetic and linguistic context, the necessary manipuables including the movable cue marker 5 and the sound cards 6,7 are selected as outlined in the written directions. These are then arranged on the planar surface, again in accordance with the directions provided with the system. The clinician first demonstrates using the multi modal cueing system. The student/client is then taught to "touch" the various markers and sound cards as the clinician provides an auditory and visual model thus providing tactile-kinesthetic cueing to these auditory and visual cues. Movement of the pointer finger across the fixed cue marker 2 denotes vowels and nonstop consonants. A tap of the same finger on the moveable cue marker 5 denotes stop consonants. At times it is necessary to allow a slight pause/break (which is eventually diminished) between the consonant and the vowel cards.

FIGS. 2A, 2B, 3A, 3B, 4A, 4B depict various arrangements for specific sound context teaching utilizing preferred selections of cue markers 2, 5 and sound cards 6, 7 on the planar surface 1.

CONCLUSION, RAMIFICATIONS AND SCOPE OF INVENTION

Thus the reader will see that the multi modal speech cueing system provides a portable, self contained apparatus and instructions for teaching speech sounds that can be utilized with a variety of methodologies, allows for flexibility within individual therapy sessions, and is simplistic enough to be used by teachers and parents to promote carryover of skills outside the therapy setting by providing additional practice.

While my above description contains many specificities, these should not be construed as limitations on the scope of the invention, but rather as an exemplification of one preferred embodiment thereof. Many other variations are possible. For example, the planar surface, cue markers, sound cards, and manner of attachment can be varied in terms of size, color, and materials.

Accordingly, the scope of the invention should be determined not by the embodiment(s) illustrated, but by the appended claims and their legal equivalents.

I claim:

1. A method of assembling and using a system for teaching inclusion and production of speech sounds comprising the steps of:

providing a planar surface made of rigid material of sufficient size to accommodate a single linear fixed cue marker wherein the planar surface comprises a plurality of securementlattachment locations, a moveable cue marker with an attachment, and specified vowel and consonant sound cards;

mounting the linear fixed cue marker and plurality of securement/attachment locations on the planar surface;

mounting the attachment to the moveable cue marker;

imprinting vowels and consonants on the sound cards;

providing written instructions which describe various arrangements of the moveable cue marker and selected sound cards;

and placing the moveable cue marker and selected sound cards on selected securement/attachment locations on the planar surface in accordance with the written instructions so as to demonstrate speech sounds, wherein the fixed cue marker denotes vowel sounds and nonstop consonants.

2. The method of claim 1, wherein the linear fixed cue marker is raised or depressed from the planar surface, and further comprising a step of denoting vowel sounds and nonstop consonants by moving a user's pointer finger along the linear fixed cue marker.

3. The method of claim 1, further comprising a step of denoting stop consonants by tapping a user's pointer finger on the moveable cue marker.

* * * * *